Oct. 22, 1929.　　　B. B. GOLDSMITH　　　1,732,332
VARNISH DRYING MACHINE
Filed Aug. 12, 1927　　　5 Sheets-Sheet 1
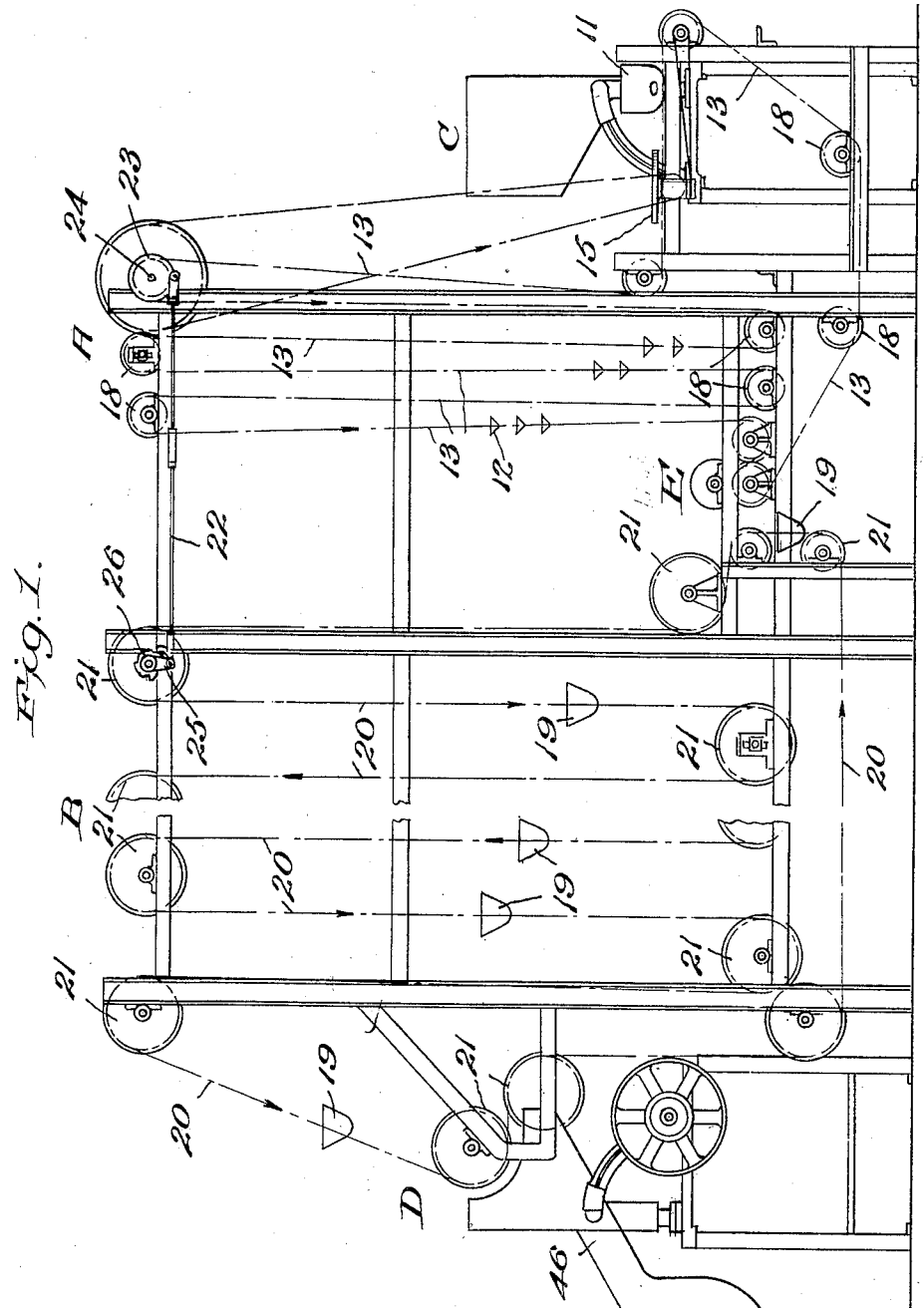
Inventor
Byron B. Goldsmith
By his Attorney

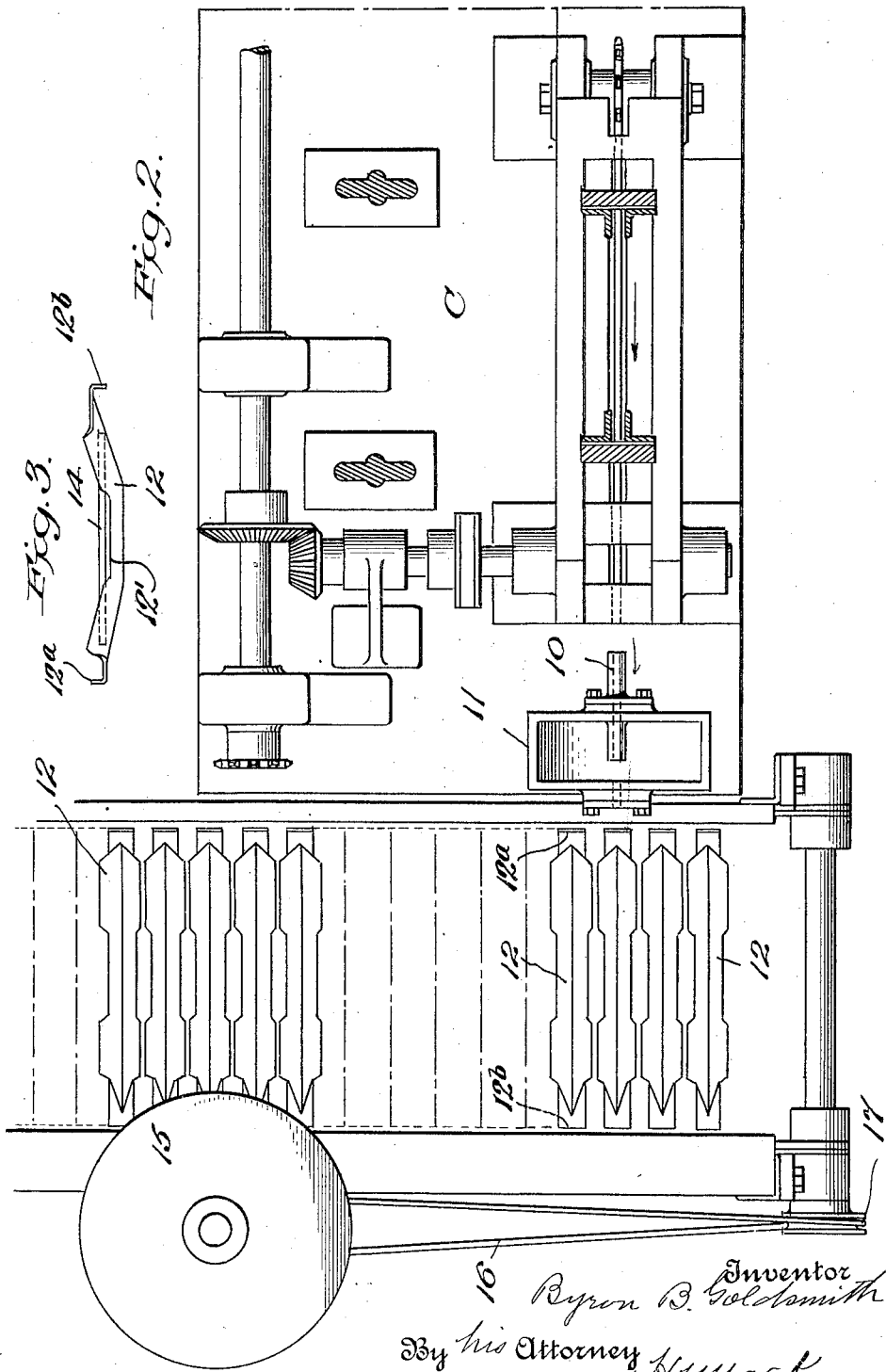

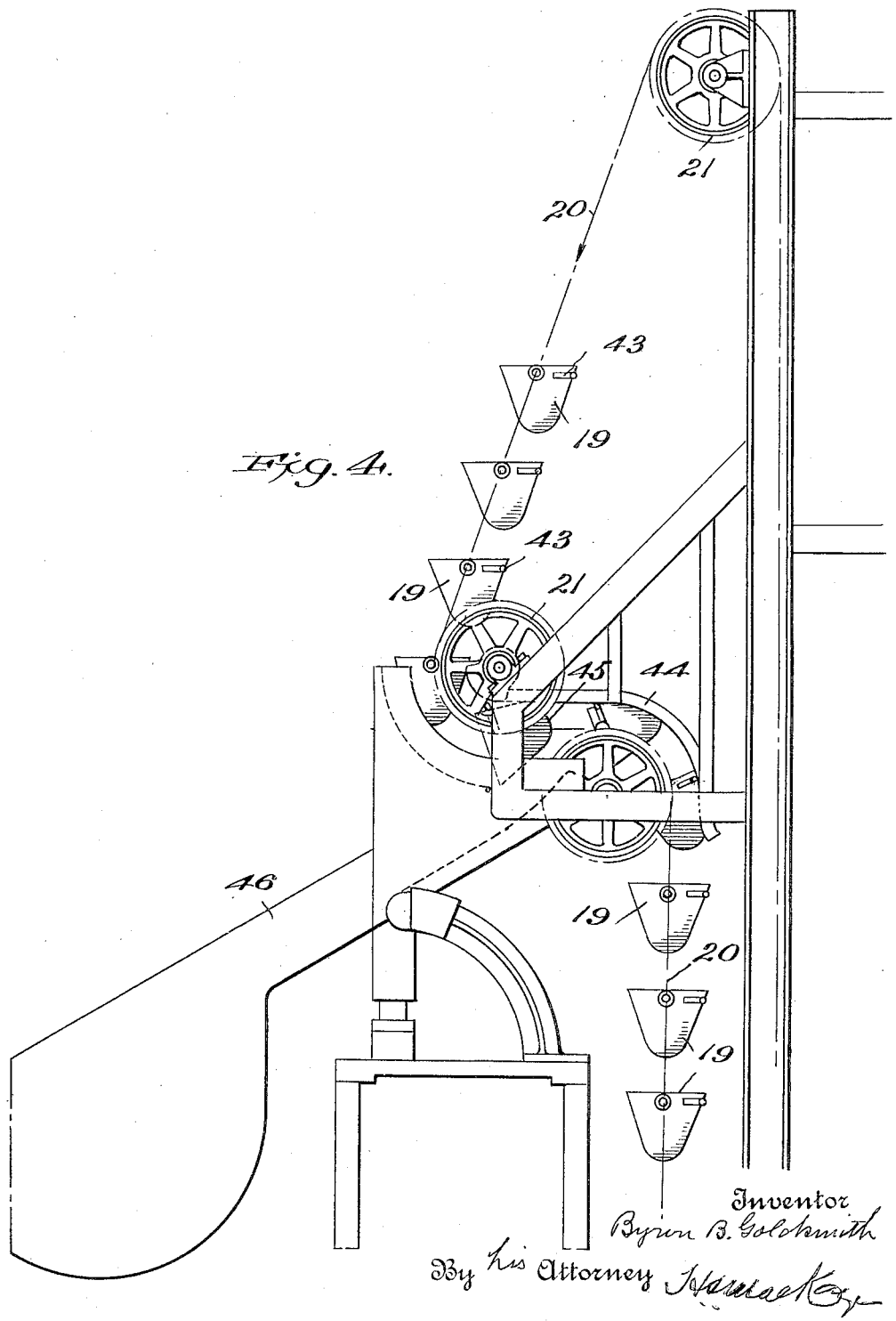

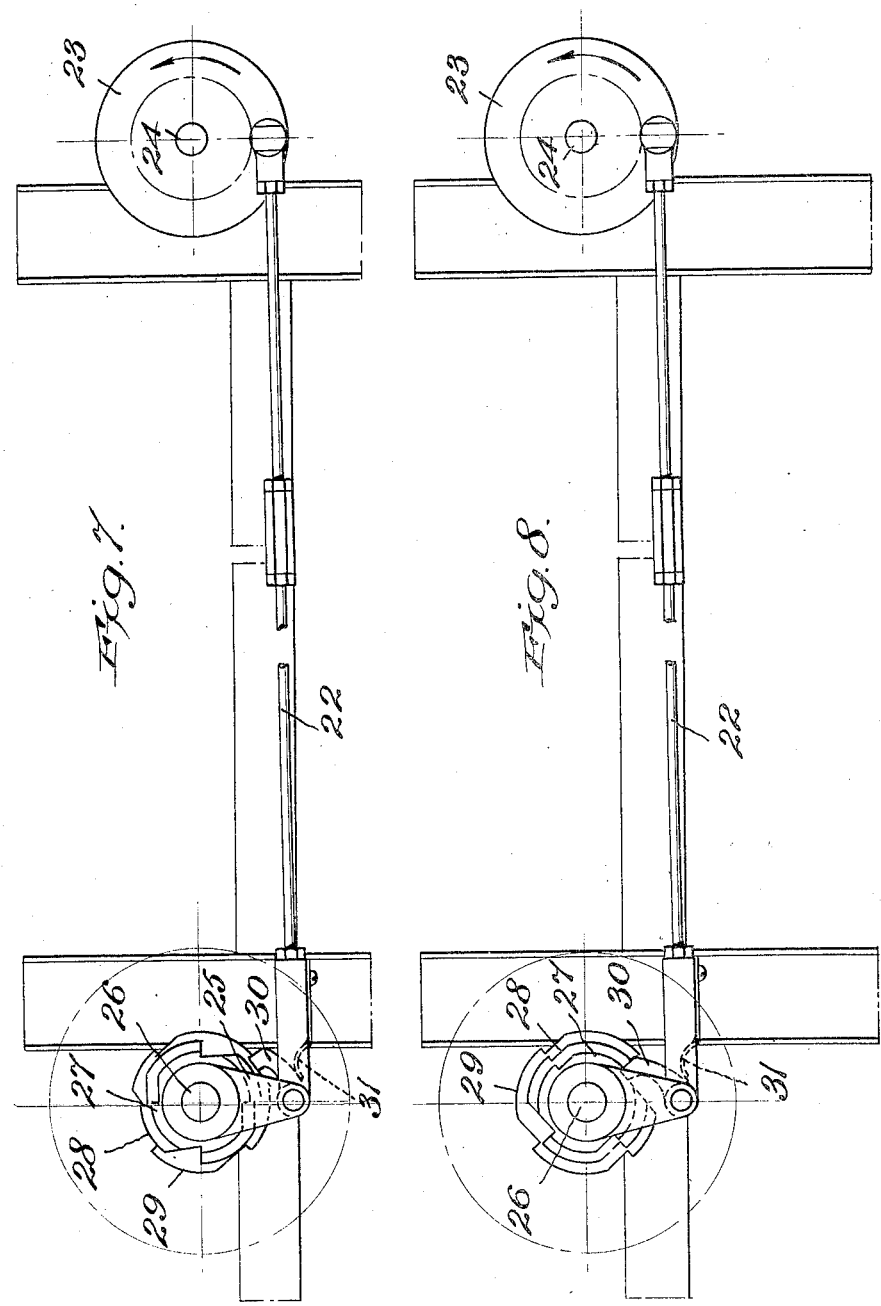

Patented Oct. 22, 1929

1,732,332

UNITED STATES PATENT OFFICE

BYRON B. GOLDSMITH, OF NEW YORK, N. Y.; GEORGE A. SPIEGELBERG, EXECUTOR OF SAID BYRON B. GOLDSMITH, DECEASED, ASSIGNOR TO AMERICAN LEAD PENCIL COMPANY, OF NEW YORK, N. Y., A CORPORATION OF NEW YORK

VARNISH-DRYING MACHINE

Application filed August 12, 1927. Serial No. 212,451.

This invention relates to method of and apparatus for drying elongated articles, such as rods, which have been coated with the material to be subsequently dried, such as by varnishing, painting, etc. More particularly the invention contemplates a novel manner of supporting and conveying such articles. The invention finds very useful application in drying articles such for example as pencils which have been varnished or painted; and is particularly applicable to such use in connection with supporting and conveying the pencils to be dried in a novel, unique and efficient manner.

Since this application of the invention has been proven to be eminently suited for this specific use and has been tested in practice, the present preferred embodiment of the invention will be described in detail in connection with such specific use, but it is to be understood that the scope of the invention is not to be limited to this specific use, but is to be commensurate with the invention as claimed in the appended claims.

Pencils when newly varnished or painted must be kept separated in order to prevent sticking together until the varnish or paint has been sufficiently dried; and similarly, articles of this general character should preferably be supported with as small supporting contact area as possible to prevent marring the coating which is to be dried. My invention contemplates particularly the method of supporting and conveying such articles while drying the same in a manner to fulfill these requirements; and supplemental thereto, I have found that after the first drying has been effected, when the articles individually supported have been progressed to a certain degree, short of complete hardening, the articles will not stick together when supported in group contact and therefore can be successfully and completely hardened in groups wherein a plurality of articles are carried in the same receptacle.

The last mentioned phase of the invention serves to reduce the size of the machine considerably, and may be found desirable in connection with the drying of certain types of articles.

My improved apparatus may be fed by hand but is preferably used in combination with an automatic mechanical varnishing or coating device which feeds the newly coated rods directly to my apparatus.

Figure 5:
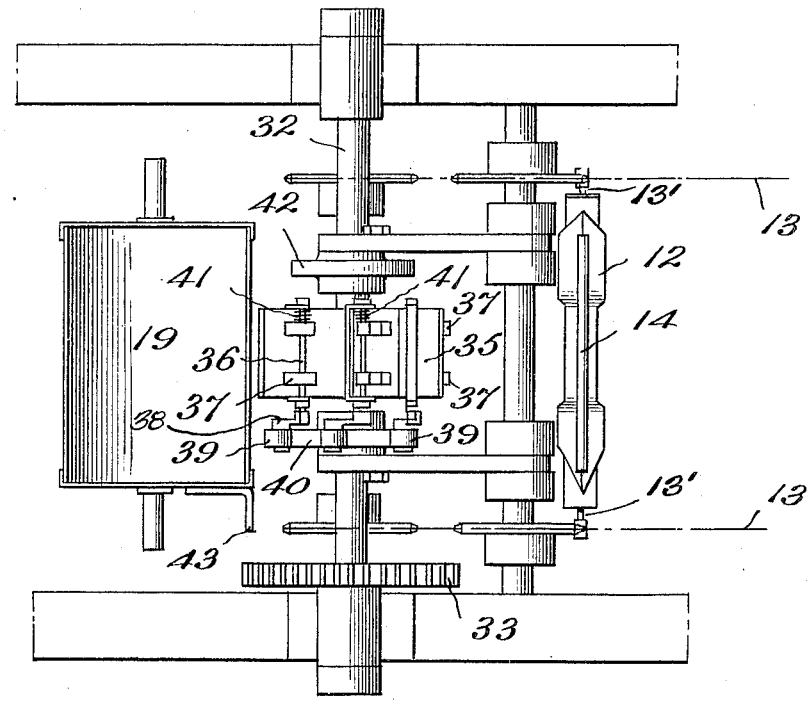
Figure 6:
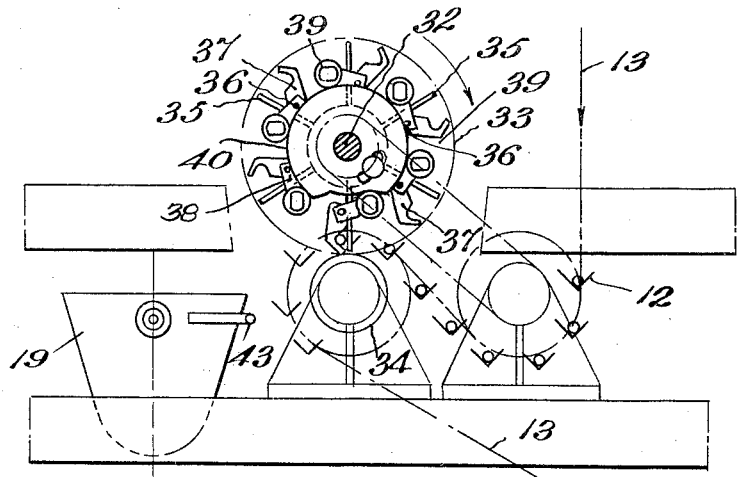

I have herein illustrated my invention in a preferred form by way of example in the accompanying drawings, wherein Fig. 1 is a more or less diagrammatic side elevation of the machine. Figure 2 is a plan view, partly in section, of the feeding in end of the machine, Figure 3 shows one of the individual containers in side elevation, Figure 4 shows the discharge end of the machine in side elevation, Figure 5 is a plan view of a part of the machine showing the "transferring means," Figure 6 is a side elevational view of a part of the same, and Figures 7 and 8 are views in side elevation of the intermittent actuator in two different positions.

My improved apparatus comprises a primary individual conveyor, a secondary group conveyor and means for transferring the rods from the former to the latter. The secondary conveyor must, of course, move intermittently to give time for the rods to be transferred singly into each group holder until the proper number has been received.

The primary conveyor may be operated to move either intermittently or continuously as desired. I prefer to make it move continuously, however, as shown herein.

In Figure 1, the primary conveyor is represented typically under the letter A, and the secondary conveyor under the letter B. The latter is shown interrupted to indicate indefinite extension and it is to be understood that the length of each conveyor will depend upon the judgment of the operator. In other words the number of pulleys and bights of the conveying chains is not necessarily that shown in the drawing.

At C in Figure 2 is indicated in a general way the feeding elements of a rod varnishing machine of any well known character, whereby rods of definite length are pushed into the receiving tube 10 of a varnisher 11, and are caused to fall duly coated with wet varnish upon the individual holders or cradles 12 suspended pivotally on conveying chains 13 (Fig. 5) by which they are carried past the point of delivery of the pencils from the varnisher 11.

The preferred shape of each cradle 12 is shown in Figures 2 and 3, in the latter of which a single rod 14 is shown. As is clearly shown in Figs. 1, 2 and 3, each individual cradle holder 12 is concave in both transverse cross section and longitudinal sectional elevation. The transverse cross section in the present embodiment being of V-formation, and the longitudinal sectional elevation being in the form of a very wide flat bottom V. This serves the dual purpose of aiding in properly centering the rods 14 both longitudinally and laterally and in providing substantially a two point contact support for the rods, so that a minumum of varnished area is in contact with the cradle; and also provides an efficient means of draining any excess varnish away from the supporting ends of the cradle, out of contact with the rod ends. Furthermore, the sides of the cradles 12 are cut away as at 12', both inwardly and downwardly; this serving the dual purpose of permitting better circulation of the drying medium and preventing any excess varnish from ever rising to the supporting ends of the cradle. This shows that the freshly varnished rods are supported at their ends only, to give the air access to all sides. The ends which are in substantial point contact with the cradle, have plenty of time to finally dry in the group containers of the secnodary conveyor.

The pivotal attachment of the cradles 12 to the chains 13 is effected by means of the ends or ears 12$^a$ and 12$^b$ (Figs. 3 and 5) which are bent into a plane normal to the pivotal axis, and are provided with bearing holes in which are journaled the pivotal supporting trunnions 13' carried by the chains 13. The ear 12$^b$ is bent downwardly to permit the positive centering of the rods in the cradles through the medium of the member 15 (Fig. 2) to be more particularly described following; and the ears 12$^a$ are bent upwardly to prevent the rods from being projected over the cradle end, as by being too far displaced by the member 15. The pivotal support of the cradles 12 is so balanced that they will normally assume the position indicated in Figs. 1, 2 and 3, under gravitational force.

The cradles 12 progress continuously from below upward in Figure 2, and the rods are projected rapidly through the varnisher 11 into one cradle after the other. In order to insure strict alignment of the rods in the cradles, I prefer to employ aligning means, such as the wheel 15 which turns continually in a horizontal plane in the position shown in Figures 1 and 2, being driven by the belt 16 from the pulley 17 which turns with the conveyor chains 13.

The cradles 12 are carried over the pulleys 18 along the course indicated by the interrupted lines 13 in Figure 1. Any convenient number of pulleys may be employed, and the particular direction and course of travel of the cradles as they are conveyed through the drying area is not an essential of the invention. The length of travel thus provided should, however, be so calculated with respect to the speed of movement and other circumstances that, when a given varnished rod reaches the transfer point and is delivered to the secondary conveyor, it will be sufficiently dried and hardened so that it will not stick to others.

The secondary or group conveyor comprises a number of carriers 19, pivotally supported in a well known manner upon conveyor chains 20 which are carried over the pulleys 21 to the final delivery point for the dried pencils at D in Figure 1. The chains 20 and containers 19 are given an intermittent movement forward in the direction of the arrows in Figure 1 by any appropriate automatic means. One preferred construction for this purpose is shown in Figures 1, 7 and 8.

A connecting rod 22 has one end pivotally attached near the periphery of a suitable wheel 23 or equivalent member, mounted on the main driving shaft 24 or in any convenient driven part of the device.

The opposite end of this connecting rod is pivotally attached to a lever 25 suspended loosely from the shaft 26 to which is fixed one of the pulleys 21 over which passes a chain 20 carrying the containers 19.

This shaft 26 also carries three toothed discs 27, 28, 29, of successively larger diameter. Of these only the smallest one 27, is fixed to the shaft 26, while 28 and 29 are loose thereon.

The left hand end of the rod 22 (as seen in Figs. 7 and 8) carries a driving pawl 30, which is broad enough to span the faces of all three discs 27, 28 and 29, and is pressed against them by the spring 31. The number of teeth possessed by these discs will depend upon the time intended to elapse between successive forward movements of the sceondary conveyor, which time interval will determine the number of rods deposited in each holder 19 in the manner hereinafter described.

Assuming each disc to have four teeth as shown, and assuming the parts to be in the position shown in Figure 8, it will be seen that, as the disc 23 turns in the direction of the arrow, the rod 22 will cause the pawl 30 to move to the right. Since this pawl is in engagement with the registering teeth of all three discs, 27, 28 and 29, it will act through the innermost disc 27 to revolve the shaft 26 and thereby drive the chains 20 which impel the secondary or group conveyor one step forward. This operation takes place during the first half turn of the disc 23.

During the second half turn of said disc, the pawl 30 moves to the left in Figure 8 and engages the next shallow tooth on the outermost disc 29, which is alone revolved during the next revolution of the disc 23. On the third subsequent operation of the pawl 30, it engages simultaneously the second and third discs 28 and 29, and thereafter these two discs move together until the position shown in Figure 8 is again reached, when the secondary conveyor moves forward one step more, and the operation just described is repeated.

This means for producing step by step motion is not of itself new and needs no further description here. My invention covers the use in this connection of any appropriate automatic means for producing intermittent motion of the secondary conveyor.

Between occurrences of forward movement of the secondary conveyer, there always stands a holder 19 opposite the rod-transferring mechanism, the position of which is indicated at E in Fig. 1. This mechanism is preferably constructed and operated as follows:

Referring to Figures 1, 5 and 6, the shaft upon which the transferring means is mounted is shown at 32. This shaft is driven, clockwise in Figure 6 as shown by the arrow, by means of a gear 33, driven by a pinion shown by its pitch line 34 in Figure 6, and turning with one of the chain-carrying wheels 18 that carry the chains supporting the individual carriers 12.

The shaft 32 carries a number of radially disposed plates 35, fixed thereto, as well as a corresponding number of revoluble shafts 36, each carrying a grasping finger 37 to which is rigidly fixed a lever 38 provided with a roller 39 adapted to roll on the surface of a cam 40, to which it is constantly held by a spring 41.

As often as the containers 12 are carried forward by the chains 13, past the transferring means, the plates 35 move successively into position immediately behind the successive rods 14. At the same time the fingers 37, which have been held away from their corresponding plates 35 by the stationary cam 40, are now permitted to move against their respective plates 35, one at a time, as the corresponding rollers 39 drop into the low portion of the cam or cams 40. This last movement is so timed as to bring the finger 37 against the face of its corresponding radial plate 35 just as the latter reaches a rod 14 in one of the holders 12. Preferably the fingers 37 are provided with a recess, as shown, to accommodate the rods 14.

By this means each rod 14 is successively lifted from the holder 12 carrying it and is carried forward to a position substantially over one edge of the bucket 19 waiting at E (Fig. 1) where the roller 39 again rides on the high part of the cam 40. This causes the finger 37 to leave the plate 35, and the rod 14 is allowed to drop into the bucket 19.

The mechanism actually shown in the drawings has only six plates 35 and six corresponding fingers 37. As preferably constructed, however, twice this number is used; the other six fingers being governed by the cam 42. These are omitted for greater clearness and are operated exactly like those shown.

From what has been described thus far, it will be seen that the rods 14, which are delivered with wet varnished surfaces, one by one to the individual holders 12, are carried forward by these carriers to the transfer point E, where the transferring device just described removes them one by one to the buckets 19 on the intermittently moving traveler. As each bucket 19 becomes sufficiently filled in this manner, the intermittent transmission shown in Figures 7 and 8 causes it to move forward, and brings another bucket 19 into the receiving position shown in Figure 6.

By the time the rods are delivered to the buckets 19, they are dried sufficiently to prevent their sticking together, and thereafter, as they move forward in clusters in the buckets 19, the drying and hardening of the rods is completed.

The buckets 19 move forward one by one to the point of final discharge which is approached in a downward slanting direction, as shown in Figure 4 by the arrow on the chain 20.

Each bucket 19 is provided on one side with a projecting cam contact 43, and, as each bucket reaches the point of discharge, this cam contact comes in contact with the under surface of a fixed cam track 44, so placed and shaped as to press the cam contact 43 in a manner to revolve the bucket on its pivotal support as shown at 45 in Fig. 4. This dumps the contents onto the receiving chute 46, and they are received thence in any convenient receptacle, or otherwise disposed of.

My device is capable of embodiment in many different modifications without departing from the scope of my invention, and I do not limit myself to the details herein shown and described.

What I claim is—

1. In apparatus of the character described, a plurality of individual container conveyor elements supported by conveyor means, each container element having downwardly convergently longitudinally sloping bottom walls and upwardly outwardly divergent side walls.

2. In apparatus of the character described, a plurality of individual container conveyor elements supported by conveyor means, each container element having downwardly convergently longitudinally sloping bottom walls and upwardly outwardly transversely divergent side walls, said side walls being cut away on opposite sides for a substantial distance longitudinally of the median transverse zone.

3. In apparatus of the character described, a plurality of individual container conveyor elements pivotally supported by flexible conveyor means, each container element being concave in longitudinal cross section and being provided with an upwardly extending limit stop adjacent one end to limit the axial movement of an article in said container.

4. In apparatus of the character described, a plurality of individual container conveyor elements for individually supporting a plurality of elongated articles longitudinally thereof, said elements being so formed and constructed that said elongated articles will be supported therein at opposite ends of said article and with a minimum contact area of support, common means for supporting and moving said elements, and means past which said elements are movable by said container means for longitudinally positioning said rods in desired position in said elements.

5. In apparatus of the character described, a plurality of individual container conveyor elements for individually supporting a plurality of elongated articles longitudinally thereof, said elements being so formed and constructed that said elongated articles will be supported therein at opposite ends of said article and with a minimum contact area of support, common means for supporting and moving said elements, means past which said elements are movable by said container means for longitudinally positioning said rods in desired position in said elements, and means carried respectively by said individual elements for limiting the longitudinal movement therein of said articles carried thereby.

6. In combination with mechanical means for delivering newly coated elongated articles, a plurality of individual container conveyor elements, means for supporting and conveying said container elements individually in successive axial alignment with said coating means, and means for moving said conveyor means in such timed relation with said coating means that successive individual container elements will be positioned in said axial alignment with said coating means respectively synchronously with the delivery from said coating means of successive coated articles.

In testimony whereof I have hereto affixed my signature on this 11th day of August, 1927.

BYRON B. GOLDSMITH.